Aug. 7, 1951     P. TRESENBERG     2,563,292
BRACKET FOR SUPPORTING MOTORS
Filed March 27, 1948
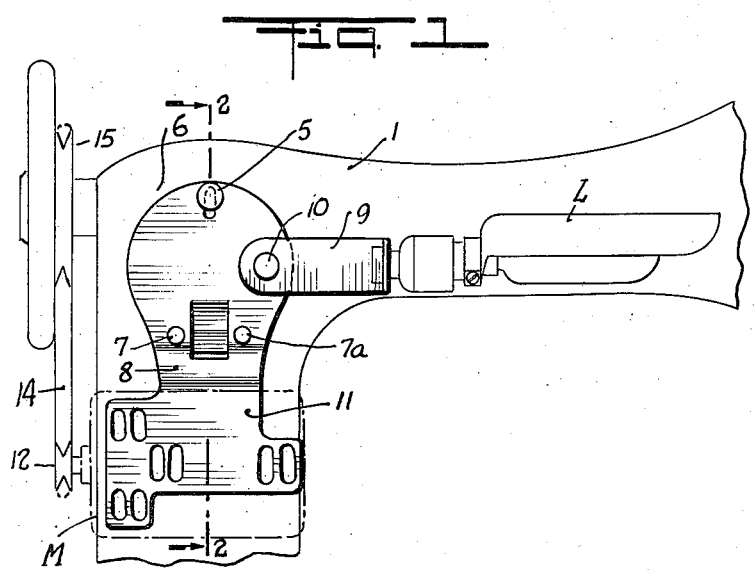
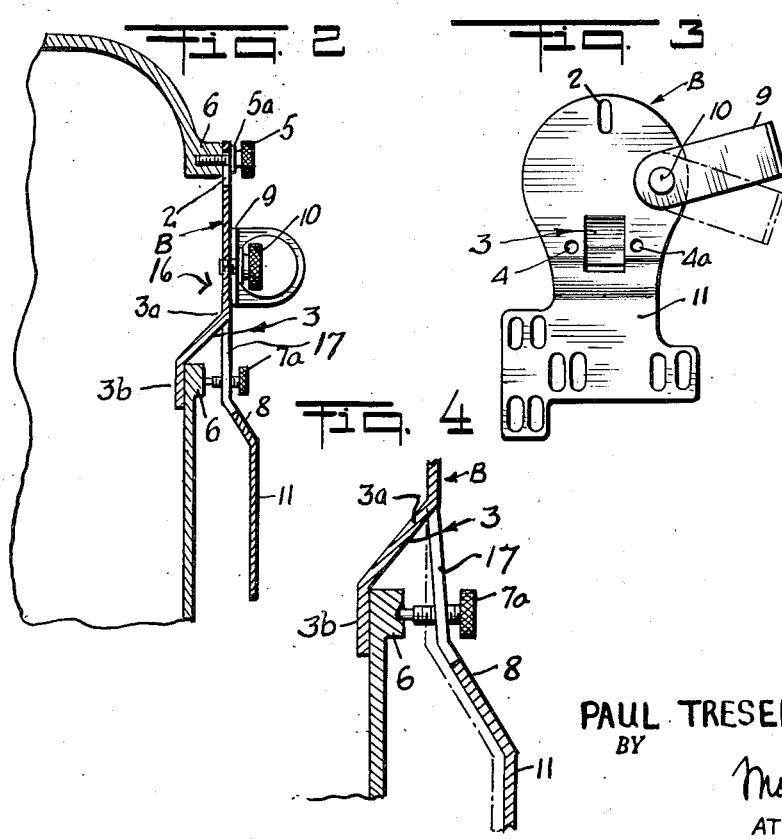
INVENTOR.
PAUL TRESENBERG
BY
Mock & Blum
ATTORNEYS Patented Aug. 7, 1951

2,563,292

UNITED STATES PATENT OFFICE 2,563,292

BRACKET FOR SUPPORTING MOTORS

Paul Tresenberg, Douglaston, N. Y., assignor to Consolidated Sewing Machine & Supply Co., Inc., New York, N. Y., a corporation of New York Application March 27, 1948, Serial No. 17,552

3 Claims. (Cl. 248—14)

1

My invention relates to a new and improved bracket for supporting a motor and connecting said motor to the head of a sewing machine or other machine, and to a new and improved combination of said motor-supporting bracket and said machine-head.

It is well-known to provide a sewing-machine-head with an opening which has a lateral circumferential wall, and to clamp a motor-supporting bracket to said sewing-machine-head. Such prior devices have used only clamping screws. In one well-known type of such prior device, the bracket is provided with an arm which is located at the inner face of said bracket, and which is connected pivotally to said bracket.

According to my invention, I provide a bracket which laterally overlies said circumferential wall in the well-known manner. I clamp the overlying edge-portion of said bracket to the sewing-machine-head in the well-known manner by a clamping screw, at one point of said overlying edge-portion.

I optionally and preferably provide a one-piece bracket which can be made from a flat metal blank by ordinary cutting and stamping operations, thus greatly reducing the cost of manufacture.

In such case, I cut the blank at three sides of a rectangle, or following any other suitable cut-out shape, to provide a tongue or arm which is integral with the body of the bracket at a junction edge of said tongue. I bend said tongue transversely inwardly relative to said body from said junction edge.

I provide the body of the bracket with two transverse and internally threaded bores, between which said opening of the bracket is located.

When the bracket is assembled with the sewing-machine-head, said bores are transversely alined with the wall of said sewing-machine-head. Said bores are also in the same transverse plane as the free end-portion of the tongue or arm, which provides a thrust member which is then located inwardly of the inner face of said circumferential wall and which abuts or is very close to the inner face of said lateral circumferential wall.

I provide each said transverse bore with a respective transverse thrust-screw, as distinguished from a clamping screw.

I turn said thrust-screws in their respective bores, in order to move them transversely towards the sewing-machine-head, until the inner tips of the shanks of said thrust screws abut the wall of the sewing-machine-head.

I then additionally turn said thrust-screws in

2 their respective bores. The cooperating and engaging threads of said thrust-screws and of said bores now force the respective part of the body of the bracket transversely away from the sewing-machine-head, thus forcing said thrust-member under suitable pressure against the respective part of the inner face of said circumferential wall. I thus releasably lock the bracket to the sewing-machine-head.

The clamping screw and said thrust-screws are preferably located at the vertices of a triangle, thus provided with three-point connection between the sewing-machine-head and the bracket.

Optionally, I provide the sewing-machine-head with recesses to receive the inner tips of the thrust-screws. By making said thrust-screws of hard steel, the force of their thrust may be sufficient to provide slight recesses in said sewing-machine-head.

These thrust-screws may be of any conventional type. They may be provided with knurled heads at their outer ends, so that said thrust-screws may be gripped with a tool and turned to exert high thrust-pressure. It is well-known to provide screws at their outer ends with square recesses, in which the square head of a tool can be inserted in order to turn such screws with considerable force, and I can use this type of screw as thrust screws.

The material of the bracket is sufficiently bendable and resilient to bend said bracket under the force of said thrust-screws and to provide firm locking engagement between the bracket and the sewing-machine-head.

If the bracket has a thrust tongue or arm which is made separately from the body of the bracket, said thrust tongue is connected or fixed at one edge or part thereof by any suitable means. However, I prefer to use a one-piece bracket which can be made and shaped cheaply by cutting and stamping dies from a flat metal blank.

Other objects and advantages of my invention are set forth in the annexed description and drawings, which disclose a preferred embodiment of my invention.

Fig. 1 is a front elevation which shows the assembly of the improved bracket with a sewing-machine-head;

Fig. 2 is a section on the line 2—2 of Fig. 1. Fig. 2 shows the tip of one of the thrust screws in initial contact with the outer face of the machine-head, before the final thrust pressure is applied;

Fig. 3 is an inner elevation of the improved bracket; and

Fig. 4 is a sectional view, similar to Fig. 2. Fig. 4 shows a broken-line position of the inner face of the bracket, which corresponds to the position of said inner face in Fig. 2. The full-line position of the bracket in Fig. 4 shows how its lower part has been thrust away from the machine head to its final position.

The sewing-machine-head 1 may be of any standard type. Said head 1 has an opening 16, which has a lateral circumferential wall 6. Fig. 2 shows that the outer or right-hand face of said wall 6 is not in the same vertical plane. Depending on the type of head 1, the entire outer face of wall 6 may be in the same vertical plane.

The bracket B may be cut and stamped to its final shape from a flat metal blank. I thus provide said bracket B with a top elongated slot or opening 2, and with an opening 17, which is of rectangular shape in this embodiment. The part of the blank which corresponds to said opening 17 is bent transversely to provide a thrust tongue or arm 3, which is integral at its top junction edge with the body of bracket B. This tongue 3 extends transversely inwardly relative to the body of the bracket to provide an intermediate flange 3a and an end-flange 3b which serves as a thrust member. The invention is not limited to this specific shape of tongue 3. The bracket B is also provided with transverse bores 4 and 4a, which are provided with internal threads in the usual manner. The tongue 3 is located laterally intermediate the laterally spaced bores 4 and 4a, which are located symmetrically and laterally at opposite sides of the elongated slot 2.

Below the opening 17, the bracket B is provided with a flange 8, which is forwardly and transversely inclined relative to the body of the bracket.

Below flange 8, the bracket is provided with a flange 11, which has openings as shown in Figs. 1 and 3 for motor securing screws.

Save for the bores 4 and 4a and their internal threads, the entire blank can be stamped and cut to final shape by well-known die operations. The finished bracket B is bendable and resilient, but is has sufficient rigidity to keep it in the normal shape shown in the drawings.

The bracket B is provided with an arm 9 which supports the socket for lamp L.

Said arm 9 can be easily cut out of the initial metal blank, so that said arm 9 is integral with and rigid relative to bracket B.

I preferably make the arm 9 separately from the bracket B, and I connect arm 9 adjustably to the bracket B by means of a screw 10 which serves as a pivot and clamping screw in the well-known manner. The threaded shank of screw 10 engages the thread of a bore of bracket B and it extends through an unthreaded bore of arm 9. When screw 10 is loosened, the arm 9 can be turned relative to bracket B to a selected adjusted position, and the screw 10 is then turned until its clamping head clamps arm 9 to bracket B.

In order to assemble bracket B with the sewing-machine-head 1 at its opening 16, I first clamp bracket B to the lateral circumferential wall 6 of opening 16, by a clamping screw 5, whose threaded shank engages the internal thread of a recess in sewing-machine-head 1. The slot 2 is of greater width than the shank of screw 5. Hence, before screw 5 is turned to final clamping position, I can adjust bracket B to the position shown in Fig. 2, in which the thrust-member 3b of tongue 3 abuts or is very close to the inner face of the wall 6.

I now insert the thrust-screws 7 and 7a in their respective internally threaded bores 4 and 4a and turn said thrust-screws 7 and 7a so that their shanks are moved transversely in the directions of the axes of said shanks, until the inner tip of said shanks abut the outer face of head 1. This is the position shown in Fig. 2.

I then additionally turn the thrust-screws 7 and 7a, thus exerting an outward transverse thrust upon the respective part of the bracket, in a transverse plane which is in alinement with the thrust-member 3b, so that said thrust-member 3b is forced under substantial pressure against the inner face of wall 6. The threads of the thrust-screws 7 and 7a are of low pitch, so that the bracket B is releasably locked in position by said thrust-screws. I can provide lock-nuts or other conventional means for holding the thrust-screws 7 and 7a in their final positions.

The flexure of the bracket from the position of Fig. 2 to the position of Fig. 4 is greatly exaggerated.

The motor M is shown in broken lines in Fig. 1, in order to show the structure of the bracket B more clearly in Fig. 1. In actual practice, the motor M is fixed to the outer face of flange 11. Fig. 1 shows a conventional belt-drive 14 between the pulley 12 on the shaft of motor M and the drive-pulley 15 of the sewing-machine-head 1.

I have disclosed a preferred embodiment of my invention, but numerous changes and omissions and additions can be made without departing from its scope. Thus, I can replace the clamping screw 5 by other conventional clamping means.

I claim:

1. In combination with a machine-head which has a head-opening which has a lateral wall, a bracket which has a body which is external to said machine-head at said head-opening, said body having an edge-portion which laterally overlies said lateral wall, fixing means which fix a fixed part of said edge-portion to said machine-head, said body having a body-opening which is alined transversely with said head-opening, said body having a tongue which is integral and rigid with said body at a junction part of said body-opening, said tongue extending transversely inwardly from said junction part into said head-opening and having a thrust-member which is alined transversely with and which abuts the inner face of said lateral wall, said bracket having two transverse and internally threaded bores which are located in said edge-portion and which are transversely alined with the outer wall of said machine-head and which are spaced from said fixed part, transverse thrust-screws having respective threaded shanks which are located respectively in said bores and having respective external threads which engage the respective internal threads of said bores, the shanks of said thrust-screws having tips which abut said outer wall of said machine-head, said thrust-screws exerting transverse thrust-pressure on said edge-portion outwardly away from said machine-head and holding said thrust member under transverse pressure against said inner face, said tongue and said body-opening being located laterally intermediate said thrust-screws.

2. A combination according to claim 1, in which said clamped portion is laterally intermediate said thrust-screws and said thrust-screws are transversely alined with said thrust-member.

3. In combination with a machine-head which has a head-opening which has a lateral wall, a bracket which has a body which is external to said machine-head at said head-opening, said body having an edge-portion which overlies said lateral wall, fixing means which fix a fixed part of said edge-portion to said machine head, a tongue which is fixed rigidly at one fixed end thereof to the inner face of said body, said tongue extending transversely inwardly from its said fixed end into said head-opening and having a thrust-member which is alined transversely with and which abuts the inner face of said lateral wall, said bracket having two transverse and internally threaded bores which are located in said edge-portion and which are transversely alined with the outer wall of said machine-head and which are spaced from said fixed part, transverse thrust-screws having respective threaded shanks which are located respectively in said bores and having respective external threads which engage the respective internal threads of said bores, the shanks of said thrust-screws having tips which abut said outer wall of said machine head, said transverse thrust screws exerting transverse pressure on said edge-portion outwardly away from said machine-head and holding said thrust-member under transverse pressure against said inner face, said tongue being located laterally intermediate said thrust-screws.

PAUL TRESENBERG.

REFERENCES CITED

The following references are of record in the file of this patent:

UNITED STATES PATENTS

| Number | Name | Date |
| --- | --- | --- |
| 888,032 | Peterson | May 19, 1908 |
| 1,536,906 | Miller | May 5, 1925 |

OTHER REFERENCES

Publication, Tinnerman, Speednuts for Aircraft, copyright 1943, Tinnerman Products, Inc., Cleveland, Ohio. (Copy in Div. 52.)